(12) United States Patent
Kumar et al.

(10) Patent No.: US 11,372,544 B2
(45) Date of Patent: Jun. 28, 2022

(54) WRITE TYPE BASED CREDITING FOR BLOCK LEVEL WRITE THROTTLING TO CONTROL IMPACT TO READ INPUT/OUTPUT OPERATIONS

(71) Applicant: NetApp, Inc., Sunnyvale, CA (US)

(72) Inventors: Ankit Kumar, Boulder, CO (US); Christopher Cason, Boulder, CO (US); Daniel David McCarthy, Erie, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/031,461

(22) Filed: Sep. 24, 2020

(65) Prior Publication Data
US 2022/0091739 A1    Mar. 24, 2022

(51) Int. Cl.
*G06F 3/06* (2006.01)

(52) U.S. Cl.
CPC ............ *G06F 3/0604* (2013.01); *G06F 3/067* (2013.01); *G06F 3/0647* (2013.01)

(58) Field of Classification Search
CPC ....... G06F 3/0604; G06F 3/0647; G06F 3/067
See application file for complete search history.

(56) References Cited

U.S. PATENT DOCUMENTS

| | | | | |
|---|---|---|---|---|
| 6,594,701 B1* | 7/2003 | Forin | ................... | G06F 12/1081 709/232 |
| 8,683,089 B1* | 3/2014 | Wong | ................... | G06F 13/1642 710/15 |
| 9,170,928 B1* | 10/2015 | Dantkale | ............. | H04L 67/1014 |
| 9,514,072 B1* | 12/2016 | Candelaria | ............ | G06F 9/5083 |
| 2012/0066439 A1* | 3/2012 | Fillingim | ............ | G06F 11/3433 711/103 |
| 2016/0179742 A1* | 6/2016 | Nale | .................... | G06F 13/1678 711/147 |
| 2019/0114276 A1* | 4/2019 | Hodes | .................... | G06F 3/0679 |
| 2019/0317665 A1* | 10/2019 | Xu | .......................... | H04L 47/25 |
| 2020/0050398 A1* | 2/2020 | Meyerowitz | .......... | G06F 3/0688 |
| 2020/0174696 A1* | 6/2020 | Sethuraman | ........ | G06F 12/0868 |
| 2020/0278799 A1* | 9/2020 | Kumar | .................. | G06F 3/0653 |

* cited by examiner

*Primary Examiner* — Ryan Bertram
(74) *Attorney, Agent, or Firm* — Jaffery Watson Mendonsa & Hamilton LLP

(57) ABSTRACT

A technique manages bandwidth allocated among input/output operations, such as reads and writes, to storage devices coupled to storage nodes of a cluster. The technique balances the writes in a manner that reduces latency of reads, while allowing the writes to complete in a desired amount of time. The writes include write types, such as client writes, data migration writes, block transfer writes, and recycling writes, which are defined by differing characteristics and relative priorities. To ensure timely completion of the write types, the technique provides periodic time intervals over which the writes may be balanced and allocated sufficient bandwidth to access the storage devices. The time intervals may include shuffle intervals within a larger distribution interval. In addition, the technique throttles certain write types at the storage device level to maintain consistent read performance. Throttling is based on a credit system that allocates bandwidth as "credits" based on write type.

20 Claims, 6 Drawing Sheets

WRITE TYPE BASED CREDITING FOR BLOCK LEVEL WRITE THROTTLING TO CONTROL IMPACT TO READ INPUT/OUTPUT OPERATIONS

BACKGROUND

Technical Field

The present disclosure relates to input/output operations, such as read and write operations, for data stored on storage devices served by storage nodes of a storage cluster and, more specifically, to managing bandwidth to the storage devices for write operations so as to reduce latency of read operations to the devices.

Background Information

A plurality of storage nodes organized as a storage cluster may provide a distributed storage architecture configured to service storage requests issued by one or more clients of the cluster. The storage requests may include input/output (I/O) operations for data stored on storage units coupled to one or more of the storage nodes of the cluster. The data served by the storage nodes may be distributed across the storage units embodied as persistent storage devices, such as hard disk drives, flash memory systems, or solid-state drives.

Typically, the I/O operations include a mix of read operations (reads) and write operations (writes), the quantity and performance of which usually varies across storage devices. Writes typically require a minimum amount of bandwidth to access the storage devices where, as used herein, the term "bandwidth" denotes an amount of data transfer, e.g., over a write path to the devices. However, as the workload serviced by the writes increases, there is an increase in latency for the reads. Allowing writes to the storage devices at a high data transfer rate can also lead to starvation of reads. It is therefore desirable to manage the bandwidth to the storage devices in a manner that allows high transfer rates for the writes, while maintaining consistent performance for the reads.

BRIEF DESCRIPTION OF THE DRAWINGS

Various embodiments herein may be better understood by referring to the following description in conjunction with the accompanying drawings in which like reference numerals indicate identically or functionally similar elements, of which.

OVERVIEW

Figure 1:
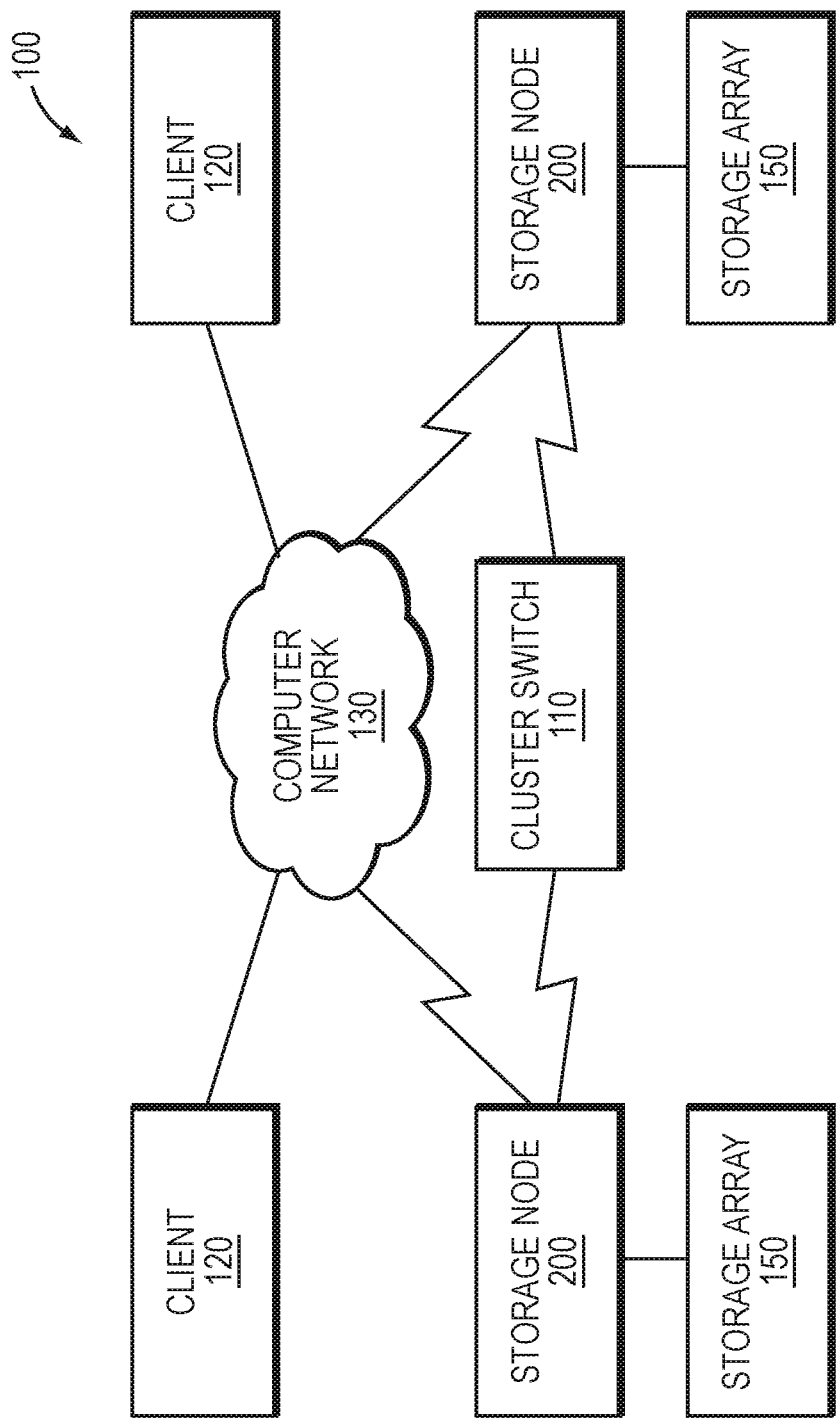
FIG. 1 is a block diagram illustrating a plurality of storage nodes interconnected as a storage cluster.

The embodiments described herein are directed to a technique configured to manage bandwidth allocated among input/output (I/O) operations, such as read and write operations, to storage devices coupled to storage nodes of a storage cluster. To that end, the technique balances the write operations (writes) in a manner that reduces latency of read operations (reads) by setting minimum allocations for the writes while limiting the total write bandwidth to the storage devices. The writes illustratively include a plurality of write-type operations (write types), such as client writes, data migration writes, block transfer writes, and recycling writes, which are defined by differing characteristics and relative priorities. To ensure steady completion of the write types, the technique provides a plurality of periodic time windows or intervals over which the writes may be balanced and allocated sufficient bandwidth to access the storage devices. Illustratively, the time intervals may include a plurality of shuffle intervals within a larger distribution interval. In addition, the technique throttles certain write types at the storage device level so as to maintain consistent read performance. Throttling is based on a credit system that allocates bandwidth as "credits" which, correspond to, e.g., Mebibytes per second (MiB/s), and are tracked as units of "bytes" during the time intervals according to write type.

In an embodiment, a storage service implemented in each storage node includes a block service layer having one or more block services configured to process and store data on one or more storage devices of the node, as well as a metadata layer having one or more metadata services configured to process and store metadata that describes the stored data. Illustratively, there is one block service associated with each storage device. A throttle manager is provided for each block service and is configured to manage credit distribution across one or more write-type throttlers within each block service, wherein there is illustratively one write-type throttler per write-type operation. The throttle manager distributes (and thereafter refills) the credits for each write-type throttler at each distribution interval based on distribution weights and a maximum desired write bandwidth according to the relative priorities of the write-types. The throttle manager also shuffles (redistributes) credits at each shuffle interval. Shuffling involves the throttle manager determining, for each write type, unused credits in a previous shuffle interval, withdrawing the unused credits from one or more write-type throttlers, returning the unused credits to the throttle manager, and redistributing the unused credits across the remaining write-type throttlers based on shuffle weights also according to the relative priorities of the write-types. Each write-type throttler tracks credits allocated and credits used in each shuffle interval. Each write-type throttler then either throttles (prevents) or allows completion of writes associated the write-type based on credit availability.

DESCRIPTION

Storage Cluster

FIG. 1 is a block diagram of a plurality of storage nodes 200 interconnected as a storage cluster 100 and configured to provide storage service for information, i.e., data and metadata, organized and stored on storage devices of the cluster. The storage nodes 200 may be interconnected by a cluster switch 110 and include functional components that cooperate to provide a distributed, scale-out storage architecture of the cluster 100. The components of each storage node 200 include hardware and software functionality that enable the node to connect to and service one or more clients 120 over a computer network 130, as well as to an external storage array 150 of storage devices, to thereby render the storage service in accordance with the distributed storage architecture.

Each client 120 may be embodied as a general-purpose computer configured to interact with the storage node 200 in accordance with a client/server model of information delivery. That is, the client 120 may request the services of the storage node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the storage node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over Fibre Channel (FCP), when accessing information in the form of storage objects such as logical units (LUNs).

Figure 2:
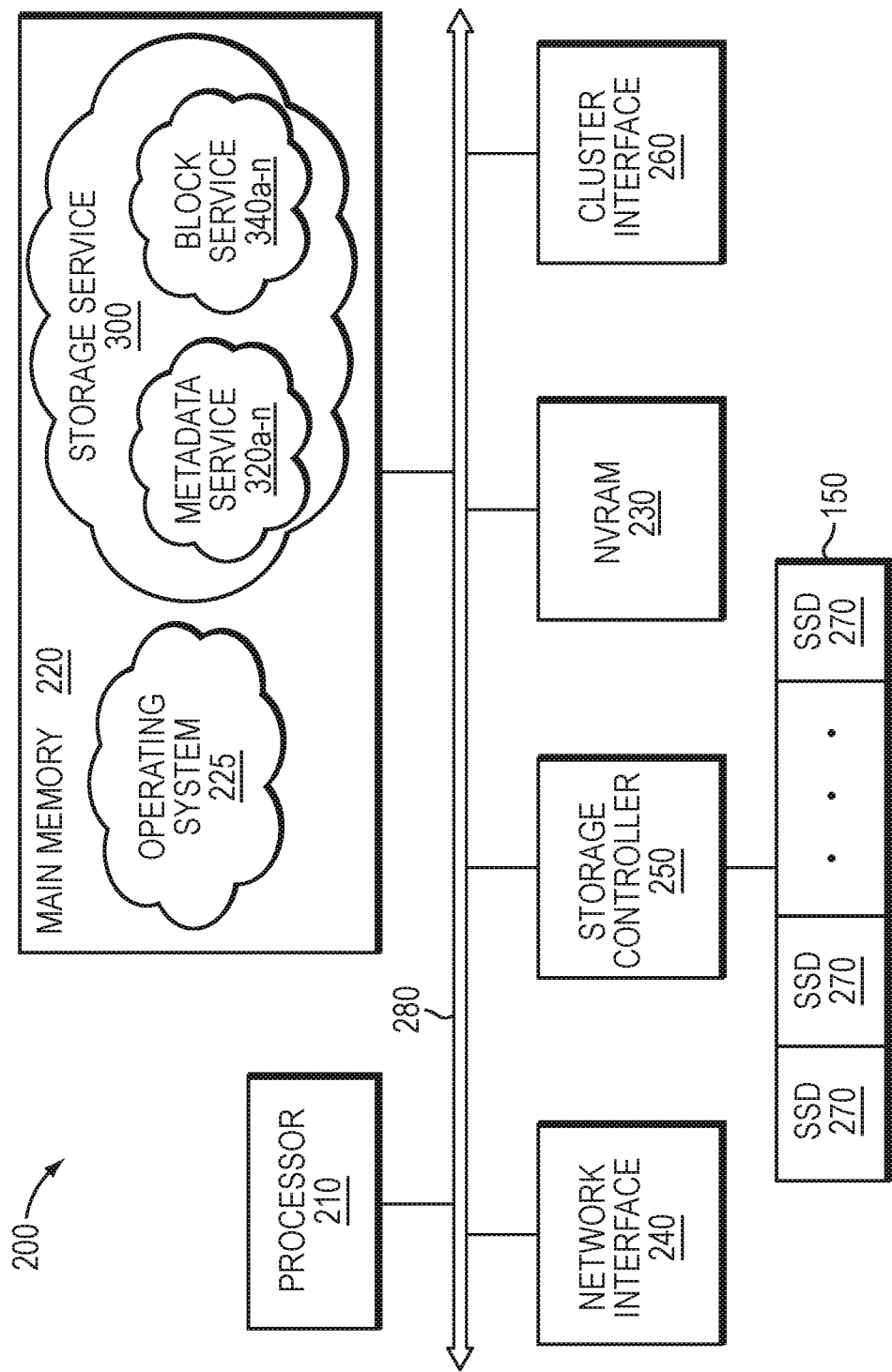
FIG. 2 is a block diagram illustrating a storage node.

FIG. 2 is a block diagram of storage node 200 illustratively embodied as a computer system having one or more processing units (processors) 210, a main memory 220, a non-volatile random access memory (NVRAM) 230, a network interface 240, one or more storage controllers 250 and a cluster interface 260 interconnected by a system bus 280. The network interface 240 may include one or more ports adapted to couple the storage node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the storage node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as one or more metadata services 320*a-n* and block services 340*a-n* of storage service 300, and manipulate the data structures. An operating system 225, portions of which are typically resident in memory 220 and executed by the processing elements (e.g., processor 210), functionally organizes the node by, inter alia, invoking operations in support of the storage service implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein. Also, while the embodiments herein are described in terms of software programs, services, code, processes, and computer, e.g., applications stored in memory, alternative embodiments also include the code, services, processes and programs being embodied as logic and/or modules consisting of hardware, software, firmware, or combinations thereof.

The storage controller 250 cooperates with the storage service 300 implemented on the storage node 200 to access information requested by the client 120. The information is preferably stored on storage devices, such as internal solid-state drives (SSDs) 270, illustratively embodied as flash storage devices, as well as SSDs of external storage array 150 (i.e., an additional storage array attached to the node). In an embodiment, the flash storage devices may be block-oriented devices (i.e., drives accessed as blocks) based on NAND flash components, e.g., single-level-cell (SLC) flash, multi-level cell (MLC) flash, triple-level cell (TLC) flash, or quad-level cell (QLC) flash and the like, although it will be understood to those skilled in the art that other block-oriented, non-volatile, solid-state electronic devices (e.g., drives based on storage class memory components) or magnetic storage devices (e.g., hard drives with rotating media) may be advantageously used with the embodiments described herein. The storage controller 250 may include one or more ports having input/output (I/O) interface circuitry that couples to the SSDs 270 over an I/O interconnect arrangement, such as a serial attached SCSI (SAS), serial ATA (SATA), and non-volatile memory express (NVMe) PCI topology.

The cluster interface 260 may include one or more ports adapted to couple the storage node 200 to the other node(s) of the cluster 100. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

Storage Service

Figure 3A:
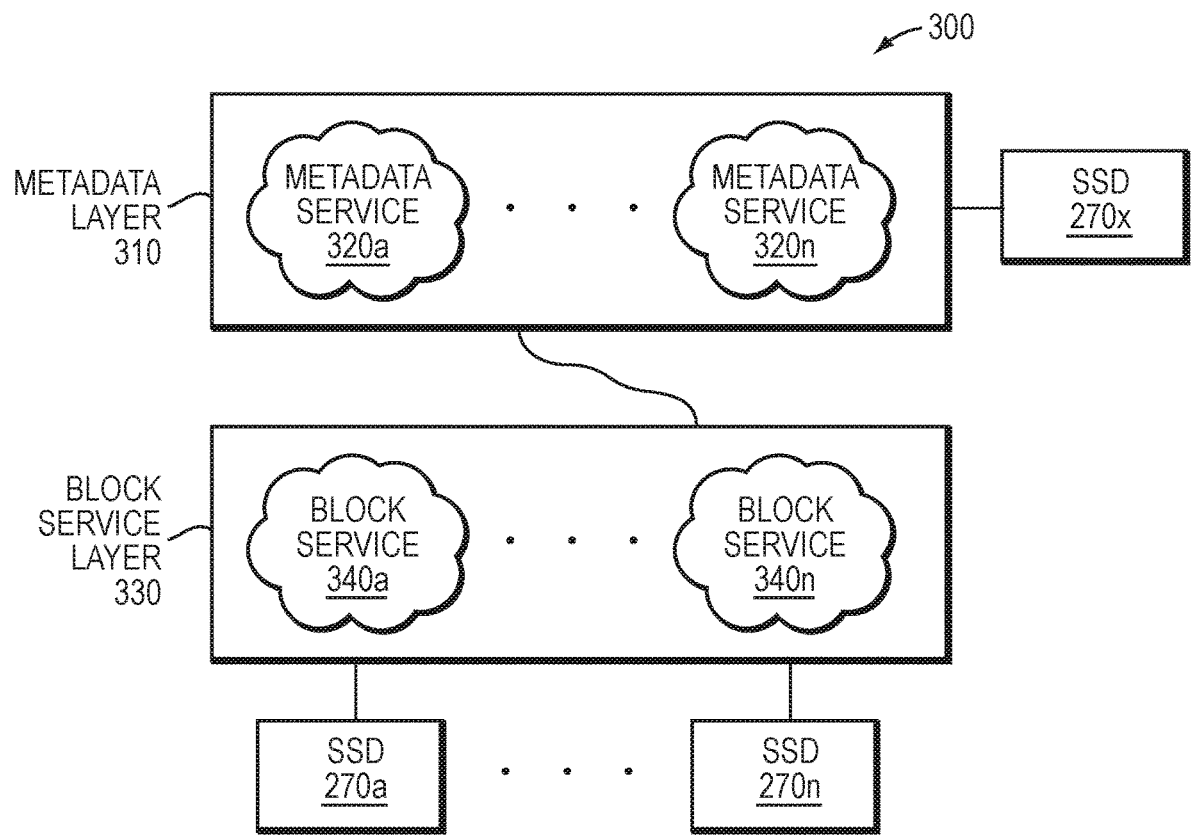
FIG. 3A is a block diagram illustrating a storage service of the storage node.

FIG. 3A is a block diagram of the storage service 300 implemented by each storage node 200 of the storage cluster 100. The storage service 300 is illustratively organized as one or more software modules or layers that cooperate with other functional components of the nodes 200 to provide the distributed storage architecture of the cluster 100. In an embodiment, the distributed storage architecture aggregates and virtualizes the components (e.g., network, memory, and compute resources) to present an abstraction of a single storage system having a large pool of storage, i.e., all storage, including internal SSDs 270 and external storage arrays 150 of the nodes 200 for the entire cluster 100. In other words, the architecture consolidates storage throughout the cluster to enable storage of the LUNs, each of which may be apportioned into one or more logical volumes ("volumes") having a logical block size of either 4096 bytes (4 KB) or 512 bytes. Each volume may be further configured with properties such as size (storage capacity) and performance settings (quality of service), as well as access control, and may be thereafter accessible (i.e., exported) as a block storage pool to the clients, preferably via iSCSI and/or FCP. Both storage capacity and performance may then be subsequently "scaled out" by growing (adding) network, memory and compute resources of the nodes 200 to the cluster 100.

Each client 120 may issue packets as I/O requests, i.e., storage requests, to access data of a volume served by a storage node 200, wherein a storage request may include data for storage on the volume (i.e., a write request) or data for retrieval from the volume (i.e., a read request), as well as client addressing in the form of a logical block address (LBA) or index into the volume based on the logical block size of the volume and a length. The client addressing may be embodied as metadata, which is separated from data within the distributed storage architecture, such that each node in the cluster may store the metadata and data on different storage devices (e.g., data on SSDs 270a-n and metadata on SSD 270x) of the storage coupled to the node. To that end, the storage service 300 implemented in each node 200 includes a metadata layer 310 having one or more metadata services 320a-n configured to process and store the metadata, e.g., on SSD 270x, and a block server layer 330 having one or more block services 340a-n configured to process and store the data, e.g., on the SSDs 270a-n. For example, the metadata services 320a-n map between client addressing (e.g., LBA or indexes) used by the clients to access the data on a volume and block addressing (e.g., block identifiers) used by the block services 340a-n to store and/or retrieve the data on the volume, e.g., of the SSDs. Illustratively, there is one block service 340 associated with each SSD 270.

Figure 3B:
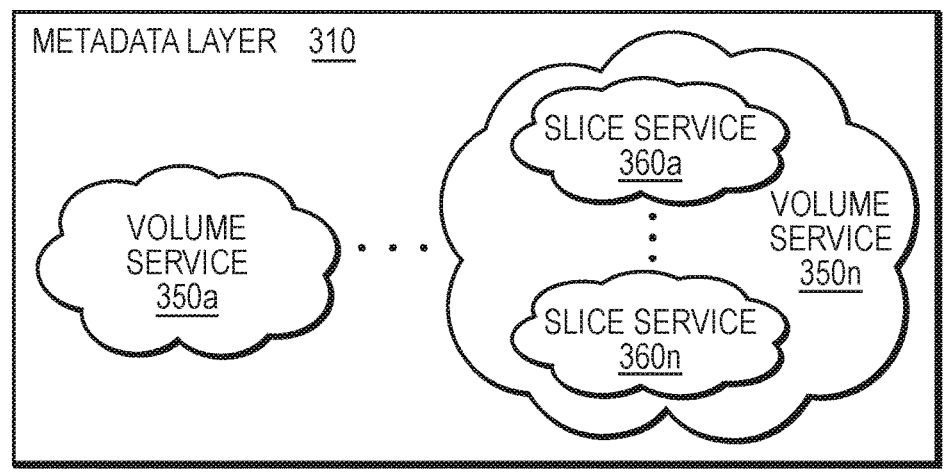
FIG. 3B is a block diagram of an exemplary embodiment of the storage service.

FIG. 3B is a block diagram of an alternative embodiment of the storage service 300. When issuing storage requests to the storage nodes, clients 120 typically connect to volumes (e.g., via indexes or LBAs) exported by the nodes. To provide an efficient implementation, the metadata layer 310 may be alternatively organized as one or more volume services 350a-n, wherein each volume service 350 may perform the functions of a metadata service 320 but at the granularity of a volume, i.e., process and store the metadata for the volume. However, the metadata for the volume may be too large for a single volume service 350 to process and store; accordingly, multiple slice services 360a-n may be associated with each volume service 350. The metadata for the volume may thus be divided into slices and a slice of metadata may be stored and processed on each slice service 360. In response to a storage request for a volume, a volume service 350 determines which slice service 360a-n contains the metadata for that volume and forwards the request to the appropriate slice service 360.

Figure 4:
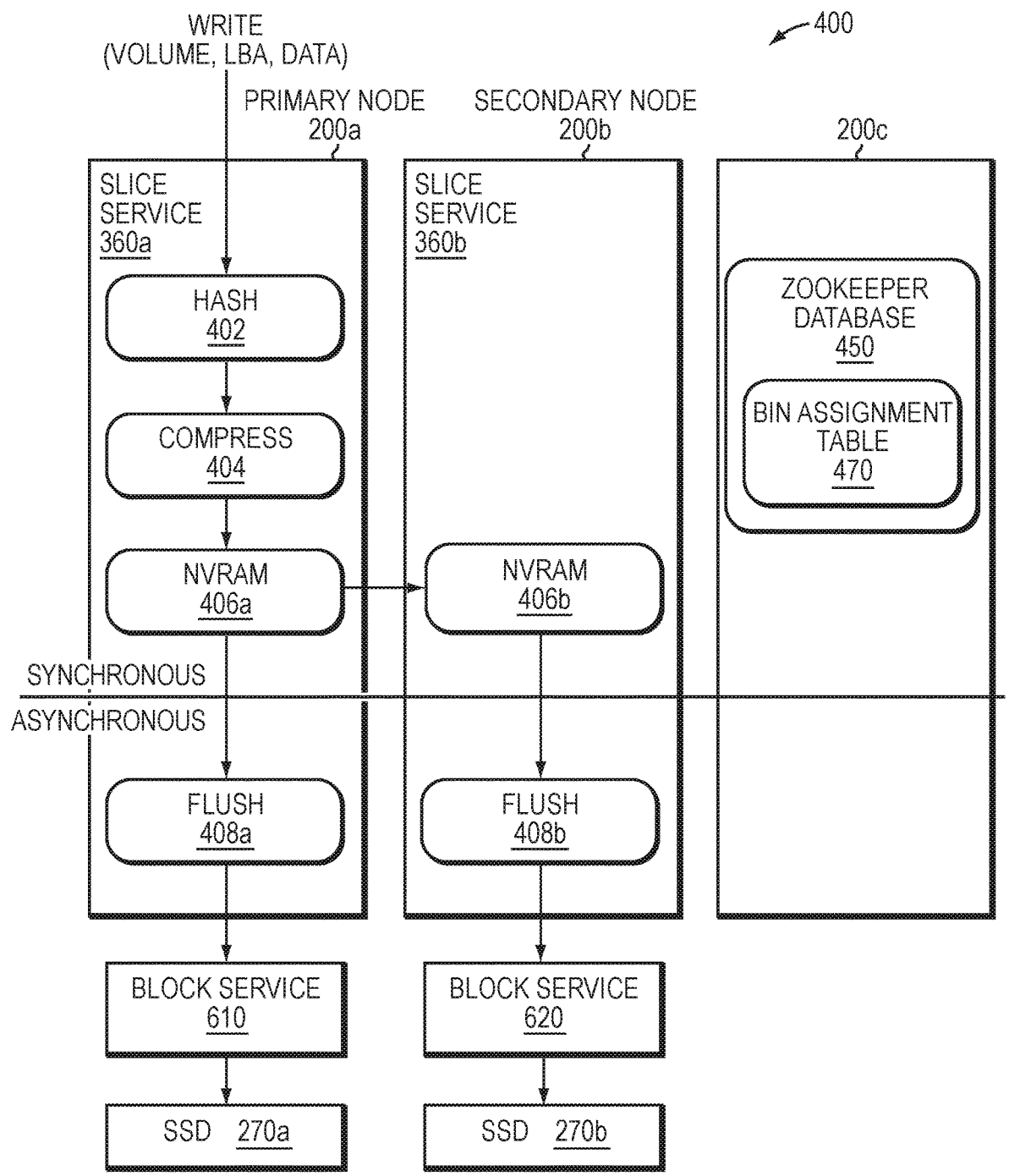
FIG. 4 illustrates a write path of the storage node.

FIG. 4 illustrates a write path 400 of a storage node 200 for storing data on a volume of storage. In an embodiment, an exemplary write request issued by a client 120 and received at a storage node 200 (e.g., primary node 200a) of the cluster 100 may have the following form:

write (volume, LBA, data)

wherein the volume specifies the logical volume to be written, the LBA is the logical block address to be written, and the data is the actual data to be written. Illustratively, the data received by a slice service 360a of the primary node 200a is divided into 4 KB block sizes. At box 402, each 4 KB data block is hashed using a cryptographic hash function to generate a 128-bit (16B) hash value (recorded as a block identifier of the data block); illustratively, the block ID is used to address (locate) the data on the internal SSDs 270 as well as the external storage array 150. A block ID is thus an identifier of a data block that is generated based on the content of the data block. The cryptographic hash function, e.g., Skein algorithm, provides a satisfactory random distribution of bits within the 16B hash value/block ID employed by the technique. At box 404, the data block is compressed using a compression algorithm, e.g., LZW (Lempel-Zif-Welch) and, at box 406a, the compressed data block is stored in NVRAM. Note that, in an embodiment, the NVRAM 230 is embodied as a write cache. Each compressed data block is then synchronously replicated to the NVRAM 230 of one or more additional storage nodes (e.g., secondary node 200b) in the cluster 100 for data protection (box 406b). An acknowledgement is returned to the client when the data block has been safely and persistently stored in the NVRAM of the multiple storage nodes 200a,b of the cluster 100.

Figure 5:
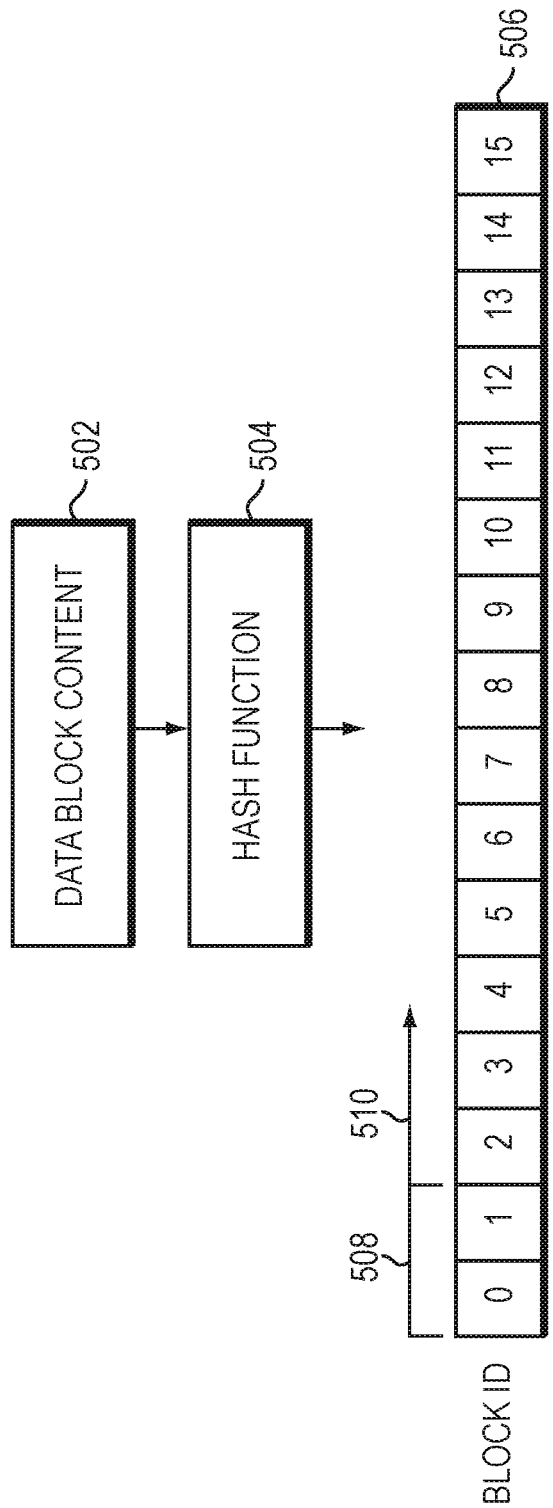
FIG. 5 is a block diagram illustrating details of a block identifier.

FIG. 5 is a block diagram illustrating details of a block identifier. In an embodiment, content 502 for a data block is received by storage service 300. As described above, the received data is divided into data blocks having content 502 that may be processed using hash function 504 to determine block identifiers (IDs). That is, the data is divided into 4 KB data blocks, and each data block is hashed to generate a 16B hash value recorded as a block ID 506 of the data block; illustratively, the block ID 506 is used to locate the data on one or more storage devices. The data is illustratively organized within bins that are maintained by a block service 340a-n for storage on the storage devices. A bin may be derived from the block ID for storage of a corresponding data block by extracting a predefined number of bits from the block ID 506.

In an embodiment, the bin may be divided into buckets or "sublists" by extending the predefined number of bits extracted from the block ID. For example, a bin field 508 of the block ID may contain the first two (e.g., most significant) bytes (2B) of the block ID 506 used to generate a bin number (identifier) between 0 and 65,535 (depending on the number of 16-bits used) that identifies a bin. The bin identifier may also be used to identify a particular block service 340a-n and associated SSD 270. A sublist field 510 may then contain the next byte (1B) of the block ID used to generate a sublist identifier between 0 and 255 (depending on the number of 8 bits used) that identifies a sublist with the bin. Dividing the bin into sublists facilitates, inter alia, network transfer (or syncing) of data among block services in the event of a failure or crash of a storage node. The number of bits used for the sublist identifier may be set to an initial value, and then adjusted later as desired. Each block service 340a-n maintains a mapping between the block ID and a location of the data block on its associated storage device/SSD, i.e., block service drive (BSD).

Illustratively, the block ID (hash value) may be used to distribute the data blocks among bins in an evenly balanced (distributed) arrangement according to capacity of the SSDs, wherein the balanced arrangement is based on "coupling" between the SSDs, i.e., each node/SSD shares approximately the same number of bins with any other node/SSD that is not in a same failure domain, i.e., protection domain, of the cluster. As a result, the data blocks are distributed across the nodes of the cluster based on content (i.e., content driven distribution of data blocks). This is advantageous for rebuilding data in the event of a failure (i.e., rebuilds) so that all SSDs perform approximately the same amount of work (e.g., reading/writing data) to enable fast and efficient rebuild by distributing the work equally among all the SSDs of the storage nodes of the cluster. In an embodiment, each block service maintains a mapping of block ID to data block location on storage devices (e.g., internal SSDs 270 and external storage array 150) coupled to the node.

Illustratively, bin assignments may be stored in a distributed key-value store across the cluster. Referring again to FIG. 4, the distributed key-value storage may be embodied as, e.g., a "zookeeper" database 450 configured to provide a distributed, shared-nothing (i.e., no single point of contention and failure) database used to store bin assignments (e.g., a bin assignment table) and configuration information that is consistent across all nodes of the cluster. In an embodiment, one or more nodes 200c has a service/process associated with the zookeeper database 450 that is configured to maintain the bin assignments (i.e., mappings) in connection with a data structure, e.g., bin assignment table 470. Illustratively the distributed zookeeper is resident on up to, e.g., five (5) selected nodes in the cluster, wherein all other nodes connect to one of the selected nodes to obtain the bin assignment information. Thus, these selected "zookeeper" nodes have replicated zookeeper database images distributed among different failure domains of nodes in the cluster so that there is no single point of failure of the zookeeper database. In other words, other nodes issue zookeeper requests to their nearest zookeeper database image (zookeeper node) to obtain current bin assignments, which may then be cached at the nodes to improve access times.

For each data block received and stored in NVRAM 230, the slice services 360a,b compute a corresponding bin number and consult the bin assignment table 470 to identify the SSDs 270a,b to which the data block is written. At boxes 408a,b, the slice services 360a,b of the nodes 200a,b then issue store requests to asynchronously flush copies of the compressed data block to the block services 340a,b associated with the identified SSDs 270a,b. An exemplary store request issued by each slice service 360a,b and received at each block service 340a,b may have the following form:

store (block ID, compressed data)

The block services 340a,b confirm receipt of the flushed data block copies to thereby assume "ownership" of the data. The block service 340a,b for each SSD 270a,b also determines if it has previously stored a copy of the data block. If not, the block service 340a,b stores the compressed data block associated with the block ID on the SSD 270a,b. Illustratively, data blocks are stored on (and retrieved from) the SSDs in accordance with write (and read) operations issued by the block services. Note that the block storage pool of aggregated SSDs is organized by content of the block ID (rather than when data was written or from where it originated) thereby providing a "content addressable" distributed storage architecture of the cluster. Such a content-addressable architecture facilitates deduplication of data "automatically" at the SSD level (i.e., for "free"), except for at least two copies of each data block stored on at least two SSDs of the cluster. In other words, the distributed storage architecture utilizes a single replication of data with inline deduplication of further copies of the data, i.e., there are at least two copies of data for redundancy purposes in the event of a hardware failure.

Write Type Based Crediting

The embodiments described herein are directed to a technique configured to manage bandwidth allocated among I/O operations, such as read and write operations, to the storage devices coupled to the storage nodes of a cluster. To that end, the technique balances the write operations (writes) in a manner that reduces latency of read operations (reads) by setting minimum allocations for the writes while limiting the total write bandwidth to the storage devices. The writes illustratively include a plurality of write-type operations (write types) defined by differing characteristics and relative priorities. For example, the write types include client-originated writes, which are typically defined by a workload of the client and may be bursty. That is, the client writes may occur asynchronously and periodically (e.g., in bursts) with generally no intervening activity. Accordingly, such write types are given a high priority for completion.

In addition, the write types include writes originated (triggered) by a system administrator, such as data migration writes (e.g., bin syncing operations) and block transfer writes (e.g., backup-restore operations). The administrator may control a pace of such writes in accordance with a defined data transfer rate. Therefore, such administrator-originated writes have a lowest priority of completion.

Another type of write involves recycling writes (e.g., garbage collection operations) which may be invoked to ensure sufficient storage space on the storage devices for, e.g., incoming client writes. Recycling writes may be triggered by a shortage of available storage space on the storage devices (such as SSDs) and a corresponding urgency to free-up storage locations on the storage devices. The recycling write types are generally not controlled by an administrator and, thus, may assume a highest priority for completion.

To ensure steady completion of the write types, the technique provides a plurality of periodic time windows or intervals over (during) which the writes may be balanced and allocated sufficient bandwidth to access the storage devices. Illustratively, the time intervals may include a plurality of shuffle intervals within a larger distribution interval. In addition, the technique throttles certain write types at the storage device level to maintain consistent read performance. Throttling is based on a credit system that allocates bandwidth as "credits" which, correspond to, e.g., Mebibytes per second (MiB/s), and are tracked as units of "bytes" during the time intervals according to write type.

Figure 6:
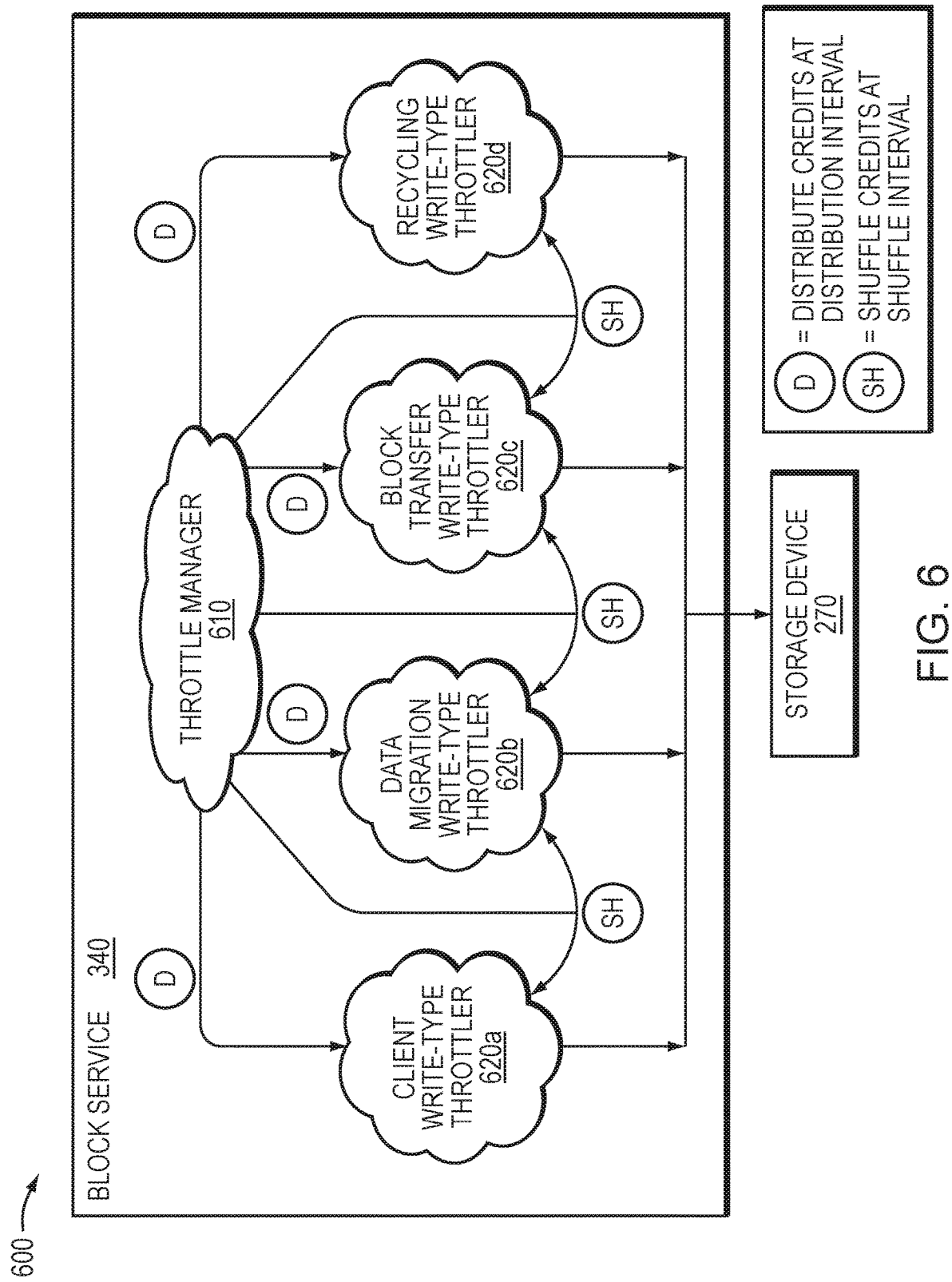
FIG. 6 illustrates an example workflow for managing bandwidth allocated among write-type operations directed to a storage device coupled to a storage node of the cluster.

FIG. 6 illustrates an example workflow 600 for managing bandwidth allocated among write-type operations directed to a storage device coupled to a storage node of the cluster. As noted, the storage service 300 implemented in each storage node 200 includes a block service layer 330 having one or more block services (BSs) 340a-n configured to process and store data on one of the storage devices, such SSDs 270a-n, of the node. Illustratively, there is one BS (denoted 340) associated with each storage device (denoted 270). According to the technique, a throttle manager 610 is a master process of each BS 340 configured to manage credit distribution/allocation across one or more write-type throttlers 620 within the BS 340, wherein there is illustratively one write-type throttler (process) associated with (per) each write type operation. For example, an illustrative embodiment includes a client write-type throttler 620a, a data migration write-type throttler 620b, a block transfer write-type throttler 620c, and a recycling write-type throttler 620d. The throttle manager 610 distributes (and thereafter refills) the credits for each write-type throttler 620a-d at a periodic distribution interval $T_d$ based on distribution weights and a maximum desired write bandwidth, e.g., expressed as a ratio or percentage of credits among the throttlers, according to the relative priorities of the write-types.

In response to one or more slice services 360a-n issuing store requests to flush (forward) copies of data blocks to BS 340, the throttle manager 610 and write-type throttlers 620a-d are invoked to manage and control the bandwidth of the writes to the storage device 270. Note that, in an embodiment, there are no read throttlers for controlling reads to the storage devices. Reads are allowed to proceed to completion without restraint primarily because large numbers of reads do not impact latencies in the same way as large numbers of writes. Consequently, reads are generally starved relative to writes. Therefore, the technique described herein is directed to controlling writes in a manner that allows the reads sufficient bandwidth to access the storage devices in a steady manner.

The throttle manager 610 also moves or "shuffles" (redistributes) credits at each shuffle interval $T_s$. Shuffling involves the throttle manager 610 determining, for each write type, unused credits of a write-type throttler in a previous shuffle interval, withdrawing the unused credits from the throttler, returning the unused credits to the throttle manager, and redistributing the unused credits across the remaining write-type throttlers based on shuffle weights, e.g., expressed as a percentage of credits allocated to each throttler, also according to the relative priorities of the write-types. For example, credits may be shuffled among write-type throttlers 620a-d so that higher priority writes (e.g., client writes) may be serviced before other writes (e.g., recycling writes). Each write-type throttler tracks the credits allocated and credits used/consumed (or unused) in each shuffle interval. Each write-type throttler 620a-d then either throttles (prevents) or allows completion of its associated write type to the storage device based on credit availability for the respective throttler.

Each write type generally requires a minimum amount of bandwidth to access the storage device 270 in a steady manner. In addition, each write type has a desired bandwidth which, while below a maximum data transfer rate, provides sufficient bandwidth for the write type to (according to a latency threshold) complete its access to the storage device without disruption. According to the technique, the throttle manager 610 cooperates with each write-type throttler 620a-d to determine the amount of desired bandwidth for allocation to each write type. The throttle manager also cooperates with each write-type throttler to render decisions as to which write type may proceed to access the storage device 270. To that end, the throttle manager 610 allocates the desired amount of bandwidth to each write-type throttler 620a-d expressed as a desired number of "credits" for its associated write type. Each write-type throttler may be configured to control the associated write-type to ensure that it is not serviced if the respective write-type throttler exceeds its allocated credits, i.e., the write type may be "throttled" or prevented from accessing the storage device and completing unless there are sufficient credits to proceed.

In an embodiment, the throttle manager 610 initially allocates to each write-type throttler 620a-d at least a desired amount of credits for its associated write type at the beginning of each distribution interval. These desired credits are assigned so that each write-type throttler always has a "baseline" of credits with which to service the write type, e.g., provide completion of some write type operations. Accordingly, the desired credits are allocated to the write-type throttler 620a-d at the start of a distribution interval and, may be shuffled (reallocated) to another write-type throttler if those credits are not used (i.e., consumed) during a credit consumption interval, wherein the number of credit consumption intervals $N_c$ is defined as the ratio of the distribution interval to the shuffle intervals. Accordingly, any desired credits that are not used/consumed in a prior consumption interval by the write-type throttler may be allocated among other write-type throttlers during a current consumption interval. Notably, $N_c-1$ shuffles occur per distribution interval.

According to the technique, credit distribution includes a distribute procedure and a shuffle procedure. The distribute procedure ("distribution") occurs every distribution interval $T_d$ units of time (e.g., expressed as milliseconds) and involves operations to determine an amount of credits to (i) initially (i.e., at the start of each distribution interval) distribute or allocate to each write-type throttler 620a-d, as well as (ii) refill for each write-type throttler. The shuffle procedure ("shuffle") occurs at the end of every consumption interval, i.e., after $T_s$ units of time, and includes a plurality of phases that involve operations to determine various amounts of credits per consumption interval, e.g., credits that are unused and to be withdrawn (handed back as available credits during the consumption interval), credits to be redistributed, and credits to be returned. That is, each of the various credits is updated at each consumption interval during the overall distribution interval. Illustratively, the throttle manager 610 and write-type throttlers 620a-d may include computer executable instructions executed by the processor 210 of a storage node 200 to perform the operations, including computations and determinations, associated with the distribute and shuffle procedures.

For example, during the distribute procedure, a total write bandwidth B (e.g., expressed as MiB/s) allowed for writes to the storage device is scaled to a given distribution interval, e.g., $(B/1000)*T_d$, to provide a total credits $TC_d$ (e.g., expressed in quantity of bytes) for every distribution interval $T_d$. Note that $TC_d$ may be limited by an amount of storage space available for writes to the storage device 270 during the distribution interval. In addition, the throttle manager 610 may define one or more throttle stages based on heuristics, such as an amount of unused storage space on the storage device. Each write-type throttler has a shuffle weight $W_s$ that may be zero for some throttlers. The sum of $W_s$ for all write-type throttlers is defined in a relative manner and, thus, may not equate to 100. For example, if the shuffle weight $W_s$ of one of the write-type throttlers is dynamically changed to 0, the "value" of $W_s$ ascribed to the other throttlers increases, i.e., they may be allocated more credits if needed. Note that if the shuffle weight $W_s$ for all throttlers is 0, shuffling is essentially disabled. Moreover, each write-type throttler has a desired weight $W_d$ that is expressed as a percentage of scaled credits based on the throttle stage and that is used to determine the amount of desired credits $C_d$ to distribute (allocate) to the respective write-type throttler: $C_d=TC_d*W_d/100$. At each distribution interval, the throttle manager 610 refills each write-type throttler 620a-d with the computed amount of desired credits $C_d$. Note that, in an embodiment, $W_d$ must be non-zero for each write-type throttler; otherwise the throttler is allocated no credits. Note also that the sum of $W_d$ for all write-type throttlers 620a-d must be 100 (i.e., representing 100 percent of desired credits).

In an embodiment, the phases of the shuffle procedure include a first phase directed to withdrawing (stealing) or harvesting unused credits from a prior consumption interval, a second phase directed to redistributing some or all of the harvested credits, and a third phase directed to returning undistributed harvested credits from the second phase. As noted, there is a plurality of shuffle intervals $T_s$ per distribution interval $T_d$, and the ratio of the distribution interval to the shuffle intervals is the number of credit consumption intervals $N_c:N_c=T_d/T_s$. Accordingly, the number of shuffles per distribution interval is $N_c-1$ and the number of remaining credit consumption intervals is $N_r$, which decrements by one after every shuffle, i.e., each time a credit consumption interval completes. Furthermore, the total credits for one consumption interval ($TC_c$) is defined as the ratio of the total credits for one distribution interval to the number of credit consumption intervals per distribution interval, e.g., $TC_c=TC_d/N_c$, and the total expected remaining credits for a distribution interval ($TE_r$) is defined as, e.g., $TE_r=N_r*TC_c$.

In the first "credit stealing" phase, $TE_r$ is computed; note that, in an embodiment, $TE_r$ is computed during a shuffle, e.g., at the end of every consumption interval. For each write-type throttler during the credit stealing phase post each credit consumption interval, the following operations and computations are performed:

i) compute credits per consumption interval $C_c=TC_c*W_d/100$;

ii) compute expected remaining credits $E_r=TE_r*W_d/100$;

iii) compute credits unused during the last consumption interval $U=C_c-C_u$, wherein $C_u$ is defined as credits used during the last consumption interval;
iv) if $U>0$, then steal these unused credits and add the stolen credits to a pool of total available credits for shuffle TA;
v) If $U<0$, then perform the following operations and computations:
   a) obtain remaining credits for the distribution interval R for the respective write-type throttler;
   b) compute extra credits needed $C_e=E_r-R$. In an embodiment, only the last consumption interval is considered when computing these extra credits. That is, if the throttler needed extra credits in some previous consumption intervals, but not for the last consumption interval, it is assumed that the workload for this throttler has subsided. The throttle manager thus attempts to provide the throttler with as many credits as needed to exhaust any backlog of writes. As a result, the extra credits needed are for the remainder of the entire distribution interval and not just the last consumption interval.
   c) update a data structure configured to track a total amount of extra credits $C_e$ needed by all write-type throttlers;
   d) update total extra credits needed $TC_e$ as a sum of $C_e$ of all write-type throttlers;
   e) update a total shuffle weight $TW_s$ as a sum of shuffle weights $W_s$ of all write-type throttlers that need extra credits. Therefore, if only one throttler needs extra credits, $TW_s=W_s$; and
   f) decrement $N_r$ by one.

In the second "credit redistribution" phase, if the throttle manager determines that (i) the total available credits for shuffle TA>0 (credits harvested in the first phase), (ii) the total shuffle weight $TW_s>0$, i.e., there is at least one write-type throttler that may obtain credits through the shuffle procedure, and (iii) there are total extra credits needed $TC_e$ for at least one throttler, i.e., $TC_e>0$, then for each write-type throttler, the following operations and computations are performed:
i) compute credits that can (able to) be allocated $C_a$ as a relative ratio of the shuffle weight $W_s$ of the respective write-type throttler to the total shuffle weight $TW_s$ of the available credits TA, i.e., $C_a=TA*W_s/TW_s$;
ii) compute credits that should be allocated $C_s$ as a minimum of $C_a$ and $C_e$;
iii) refill (allocate) the respective write-type throttler with the computed $C_s$ of step (ii);
iv) update total credits distributed during the credit redistribution (second) phase TR as sum of allocated credits $C_s$ to all write-type throttlers; and
v) update the pool of total available credits TA, as TA=TA−TR.

In the third "credit return" phase, if TA>0 (i.e., not all of the write-type throttlers used their credits during the previous consumption interval and the throttlers do not need more credits during the current consumption interval), then for each write-type throttler, the following operations and computations are performed:
i) compute credits to return $C_r$, as $C_r=TA*W_d/100$; and
ii) refill the write-type throttler with $C_r$.

In sum, the technique described herein is directed to write throttling for the various write-types to realize a plurality of goals, including reducing read latency. Reduction in read latency entails limiting the net bandwidth for writes to the storage device and spreading-out the writes to achieve an improved average performance curve devoid of the peaks typical of bursty writes. Moreover, since bursty writes cause reads to have corresponding peaks and valleys, the technique also regulates read latencies by reducing those read latency peaks. In this manner, a consistent I/O latency for reads and for writes may be achieved.

In an embodiment, the technique also involves allocating sufficient bandwidth to each write-type throttler, without compromising bandwidth needs for other write-type throttlers. To that end, each write-type throttler is initially allocated (e.g., during the distribution interval) at least a desired amount of credits sufficient to satisfy any write burst to the storage device for its associated write type. By utilizing the total amount of allocated credits over the distribution interval, the performance curve (e.g., a data transfer amount or IOPS) at the granularity of the distribution interval may be flattened, so as to reduce read latency peaks and achieve a consistent (predictable) read latency. Write activity among the write types may also be balanced, so as to reduce bursts by write type while preventing starvation (e.g., maintain a minimum write completion rate) at the expense of servicing other higher priority writes.

Note that the above embodiments depend upon the duration and frequency of the distribution and shuffle intervals, as well as the distribution and shuffle weights. Selection of these values (particularly the weights) impacts the amount of credits allocated to each write-type throttler. Since the values are defined per throttle stage, tuning of each stage is important. For example, if the storage device is running low on storage space, it may be desirable to increase the rate of recycling (e.g., garbage collection) so as to complete the recycling write-type operations faster and free storage space; otherwise there may be insufficient storage space (locations) available to accommodate any writes. In addition, the maximum amount of credits allocated in a distribution interval may be limited by the amount of available storage space of the storage device. In other words, if credit distribution for one distribution interval generally results in allocation of 400 MiB/s of credits, but there remains only 100 MiB of storage space available for the writes, then the technique would only distribute 100 MiB/s of credits for the distribution interval representing a greatest possible amount of data writable to the available storage space during the distribution interval.

Advantageously, credit distribution and shuffling are performed in a balanced manner based on relative priorities of the write-type throttlers. In other words, shuffling during shuffle intervals enables balancing of the writes (i.e., write types) over the distribution interval so that each write type has a fair opportunity to timely complete its access to the storage device depending upon the urgency and priority of the write type. Such balanced shuffling also reduces latency of reads to the storage devices.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    storing data blocks on a storage device of a cluster in accordance with write operations issued by a service of a node coupled to the storage device, the write operations including a plurality of write-type operations defined by differing characteristics and relative priorities;
    invoking a throttle manager and a plurality of write-type throttlers of the service to manage bandwidth as credits for the write-type operations to the storage device, the throttle manager configured to manage allocation of the credits across the write-type throttlers, wherein there is one write-type throttler associated with each write-type operation, each write-type throttler configured to track the credits allocated by the throttle manager;
    providing a plurality of time intervals during which the write-type operations are allocated credits to access the storage device, the time intervals including a plurality of shuffle intervals within a distribution interval; and
    one of preventing and allowing completion of the write-type operations to the storage device based on credit availability.

2. The method of claim 1 wherein the credits are expressed as bandwidth units of data transmission.

3. The method of claim 1 wherein the write-type throttlers comprise a client write-type throttler associated with client write type operations, a data migration write-type throttler associated with data migration write type operations, a block transfer write-type throttler associated with block transfer write type operations, and a recycling write-type throttler associated with recycling write type operations.

4. The method of claim 1 further comprising distributing the credits from the throttle manager to each write-type throttler at the distribution interval based on distribution weights.

5. The method of claim 4 wherein the distribution weights are expressed as a percentage of credits according to the relative priorities of the write-type operations.

6. The method of claim 1 further comprising shuffling the credits among the write-type throttlers at each shuffle interval based on shuffle weights.

7. The method of claim 6 wherein shuffling the credits among the write-type throttlers comprises:
    determining, for each write type, unused credits of a write-type throttler in a previous shuffle interval;
    withdrawing the unused credits from the write-type throttler; and
    redistributing the unused credits across remaining write-type throttlers.

8. The method of claim 6 wherein the shuffle weights are expressed as a percentage of credits according to the relative priorities of the write-type operations.

9. The method of claim 1 wherein the service is a block service of the cluster configured to provide a distributed storage architecture and wherein throttle manager is a master process of the block service.

10. A system comprising:
    a storage node of a storage cluster coupled to one or more storage devices;
    a processor included in the storage node, the processor executing instructions configured to,
        store data blocks on a storage device of the storage cluster in accordance with write operations issued by a service of the storage node, the write operations including a plurality of write-type operations defined by differing characteristics and relative priorities;
        invoke a throttle manager and a plurality of write-type throttlers of the service to manage bandwidth as credits for the write-type operations to the storage device, the throttle manager configured to manage allocation of the credits across the write-type throttlers, wherein there is one write-type throttler associated with each write-type operation, each write-type throttler configured to track the credits allocated by the throttle manager;
        provide a plurality of time intervals during which the write-type operations are allocated credits to access the storage device, the time intervals including a plurality of shuffle intervals within a distribution interval; and
        one of prevent and allow completion of the write-type operations to the storage device based on credit availability.

11. The system of claim 10 wherein the credits are expressed as bandwidth units of data transmission.

12. The system of claim 10 wherein the processor executes instructions further configured to distribute the credits from the throttle manager to each write-type throttler at the distribution interval based on distribution weights expressed as a percentage of credits according to the relative priorities of the write-type operations.

13. The system of claim 10 wherein the processor executes instructions further configured to shuffle the credits among the write-type throttlers at each shuffle interval based on shuffle weights expressed as a percentage of credits according to the relative priorities of the write-type operations.

14. The system of claim 13 wherein the processor executing instructions to shuffle the credits among the write-type throttlers further executes instructions configured to,
    determine, for each write type, unused credits of a write-type throttler in a previous shuffle interval;
    withdraw the unused credits from the write-type throttler; and
    redistribute the unused credits across remaining write-type throttlers.

15. The system of claim 10 the service is a block service of the storage cluster configured to provide a distributed storage architecture and wherein throttle manager is a master process of the block service.

16. A non-transitory computer-readable medium comprising instructions configured to:
    store data blocks on a storage device of a storage cluster in accordance with write operations issued by a service of a storage node coupled to the storage device, the write operations including a plurality of write-type operations defined by differing characteristics and relative priorities;
    invoke a throttle manager and a plurality of write-type throttlers of the service to manage bandwidth as credits for the write-type operations to the storage device, the throttle manager configured to manage allocation of credits across the write-type throttlers, wherein there is one write-type throttler associated with each write-type operation, each write-type throttler configured to track the credits allocated by the throttle manager;
    provide a plurality of time intervals during which the write-type operations are allocated credits to access the storage device, the time intervals including a plurality of shuffle intervals within a distribution interval; and one of prevent and allow completion of the write-type operations to the storage device based on credit availability.

17. The non-transitory computer-readable medium of claim 16 wherein the instructions are further configured to:

distribute the credits from the throttle manager to each write-type throttler at the distribution interval based on distribution weights expressed as a percentage of credits according to the relative priorities of the write-type operations.

18. The non-transitory computer-readable medium of claim 16 wherein the instructions are further configured to:

shuffle the credits among the write-type throttlers at each shuffle interval based on shuffle weights expressed as a percentage of credits according to the relative priorities of the write-type operations.

19. The non-transitory computer-readable medium of claim 18 wherein the instructions to shuffle the credits are further configured to:

determine, for each write type, unused credits of a write-type throttler in a previous shuffle interval;

withdraw the unused credits from the write-type throttler; and redistribute the unused credits across remaining write-type throttlers.

20. The system of claim 10, wherein the plurality of write-type throttlers comprise:

a client write-type throttler associated with client write type operations;

a data migration write-type throttler associated with data migration write type operations;

a block transfer write-type throttler associated with block transfer write type operations; and a recycling write-type throttler associated with recycling write type operations.

* * * * *